United States Patent [19]

Bezimensky

[11] 3,940,929

[45] Mar. 2, 1976

[54] HYDRODYNAMIC TRANSMISSION SYSTEM

[76] Inventor: Alexandre Bezimensky, 9, Rue Lekain, Paris, France

[22] Filed: Dec. 3, 1974

[21] Appl. No.: 529,211

[52] U.S. Cl. ............... 60/330; 60/338; 60/361; 60/366; 60/367
[51] Int. Cl.² ............................................. F16D 33/00
[58] Field of Search ............ 60/327, 330, 338, 347, 60/361, 365, 366, 367

[56] References Cited
UNITED STATES PATENTS

| | | | |
|---|---|---|---|
| 2,306,758 | 12/1942 | Schneider et al. | 60/361 |
| 2,410,185 | 10/1946 | Schneider et al. | 60/361 |
| 2,663,149 | 12/1953 | Zeidler et al. | 60/367 X |
| 3,431,728 | 3/1969 | Bezimensky | 60/366 |

*Primary Examiner*—Edgar W. Geoghegan
*Attorney, Agent, or Firm*—Fleit & Jacobson

[57] ABSTRACT

The invention relates to a hydrodynamic transmission system comprising at least one pump and a bladed turbine arranged to form a toroidal fluid circuit.

The leading edges of the blades of the pump and turbine are inclined relative to the corresponding radial plane, and the blades are designed in such a way as to extend the path followed by the streams of fluid nearest the centre relative to the path followed by the streams of fluid furthest away from the centre. There is thus obtained a reduction in the shock and friction losses to improve performance and increase the starting torque.

Disclosed application is to automobile vehicles.

17 Claims, 18 Drawing Figures

HYDRODYNAMIC TRANSMISSION SYSTEM

This invention relates to hydrodynamic transmission systems, such as couplers and torque converters, used in particular in automobile vehicles and comprising at least one pump and a bladed turbine, arranged to form a toroidal fluid circuit, and a reaction member in the case of torque converters.

Known systems of this kind are attended by the serious disadvantage that they undergo a rapid decrease in output at low speeds of the turbine(s), and by the further disadvantage that they have a very inadequate starting torque with the result that, in cases where they are used in automobile vehicles in particular, it is necessary to provide a gear box.

These inadequacies are due above all to so-called shock losses and to the friction losses of the fluid. The shock losses take place as the fluid passes from one wheel to another, whilst the friction losses take place inside each wheel. Certain improvements which have already been proposed are based on the controlled variation of the angle of incidence of the blades for reducing the shock losses of the wheel in question, and on the consecutive reduction of the rate of flow of the circulating fluid. These complicated solutions are not sufficiently reliable.

The object of the present invention is to improve performance and to increase the starting torque.

U.S. Pat. No. 3,431,728, in the name of the same Applicant, describes an arrangement of blades at the inlet end of the turbine which produces a significant reduction in the shock losses.

This arrangement is distinguished by the fact that the line of the leading edge of the blades of the turbine is inclined towards the radius, and by the fact that the blades of the turbine are shaped accordingly. In particular, the plane of their leading edge is parallel to the mean position of the streams of fluid coming from the pump.

The effect of this arrangement is to reduce the amplitude of variation of the angle at which the streams of fluid coming from the pump attack the blades of the turbine.

This angle generally varies from 15° to 20° on either side of its mean position in dependence upon the relative speeds of the pump and turbine. The proposed arrangement reduces this variation to 4° or 5°.

The present invention extends this arrangement to the blades of the pumps of at least the torque converters or couplers, and in addition associates with them a particular configuration of said blades.

The hydrodynamic transmission system according to the invention is essentially distinguished by the fact that the blades of the pump and turbine have their leading edges inclined relative to the corresponding radial plane, and by the fact that these blades are designed in such a way as to extend the path followed by the streams of fluid nearest the centre relative to the path followed by the streams of fluid furthest away from the centre.

By reducing the differences in path length between the streams of fluid, which is the object of the above-mentioned inclination of the leading edges of the blades, it is possible to obtain a reduction in the friction losses of the fluid in addition to the reduction in the shock losses.

Accordingly, the invention enables the energy made available by the reduction in the aforementioned losses and reflected in an increase in the circulation of fluid to be used with advantage in the turbine(s).

Part of this energy is absorbed by the increased friction losses, but the increase in the rate of circulation develops an increased useful torque in the turbine(s) which absorbs the rest of the available energy.

The invention also relates to various means for utilizing in particular the increase in energy in question in the turbine(s) by relative reduction of the flow cross-sections of the fluid and/or of the mean outlet radius of the fluid.

The invention also relates to an arrangement comprising an intermediate turbine with variable-pitch blades, and to the control of those blades.

Various embodiments of hydrodynamic transmission systems according to the invention are described by way of example in the following with reference to the accompanying drawings, wherein.

Figure 1:
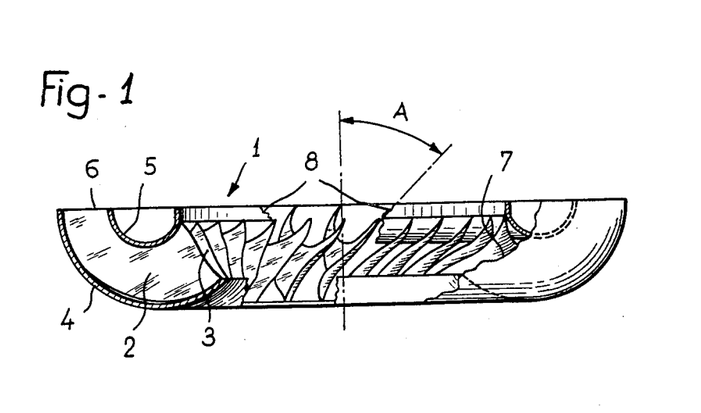
FIG. 1 is a section, with parts broken away, through a pump whose blades are seen in the direction of the arrows I—I in FIG. 2.
Figure 2:
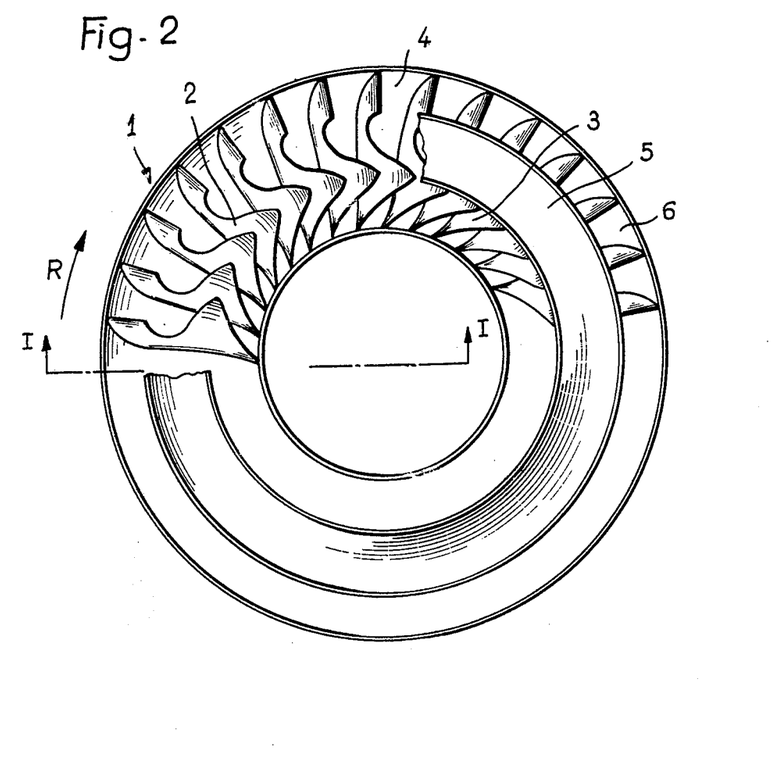
FIG. 2 is a plan view of the pump illustrated in FIG. 1 at the inlet and outlet end of the fluid with parts broken away to show the shape of the blades, of which only a few are illustrated.

FIGS. 1 and 2 show one embodiment of a pump 1 whose blades 2 are inclined at the inlet end 3 of the fluid to reduce the so-called shock losses. These blades extend between an outer shell 4 and an inner shell 5 generally semi-toroidal in shape which, between them, form an annular outlet 6 for the fluid in addition to the annular inlet 3. In FIG. 1, the outer shell 4 is cut at 7 and the inner shell 5 broken away at 8 in order to illustrate the blades more clearly. Similarly, the inner shell 5 shown in FIG. 2 is broken away in the top left-hand quarter. At the inlet 3, the leading edge of the blades 2 is inclined relative to the radial plane through an angle A, the optimum value of this angle being between 40° and 60° although it may even be as much as 75°.

In this case, the leading edges are inclined towards the front of the intended direction of rotation R of the pump (cf. FIG. 2) starting from the point at which they are closest to the axis of the pump. However, a symmetrical inclination relative to the radial plane could also be used.

Each blade has a generally helical configuration and, in the present case, terminates in a radial trailing edge. Accordingly, the configuration of the blade is such that it enables the path followed by the streams of fluid nearest the centre (those circulating along the inner shell 5) to be lengthened relative to the path followed by the streams of fluid furthest away from the centre (those circulating along the outer shell 4) and, in particular, in relation to what they would be in the case of a radial leading edge of the blade or a leading edge adjacent a radial plane.

The effect of this is to reduce internal friction through better harmonization of the flow of the streams of liquid in the pump.

Figure 3:
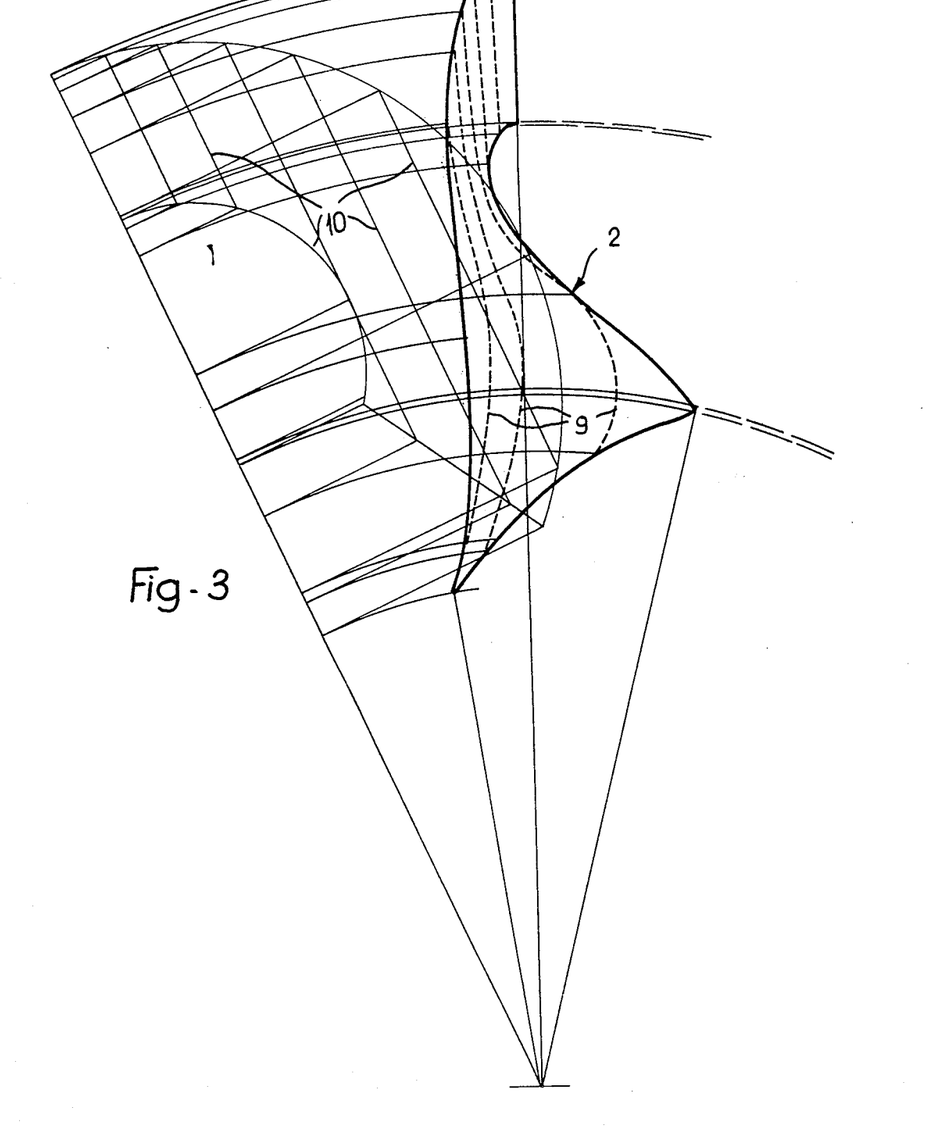
FIG. 3 is a view illustrating one form of blade belonging to the pump.

FIG. 3 illustrates one example of the configuration of such a blade in chain lines 9 with reference to the blade 2 illustrated in FIG. 3, traces of planes of intersection with that blade extending parallel to the axis of the pump and to the trailing edge of the blade and defined in the present case by the straight lines 10.

Figure 4:
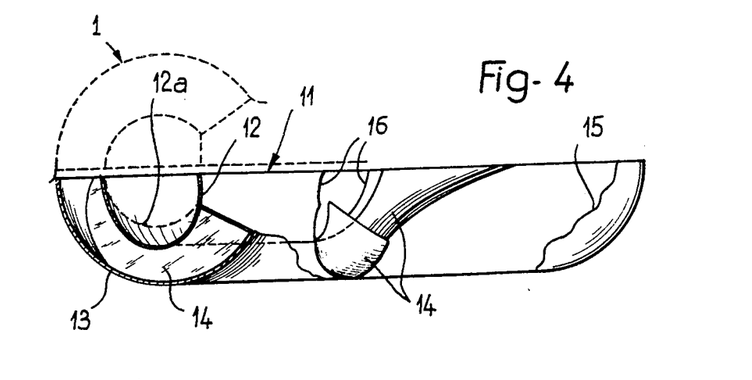
FIG. 4 is a section through a turbine with parts broken away.
Figure 5:
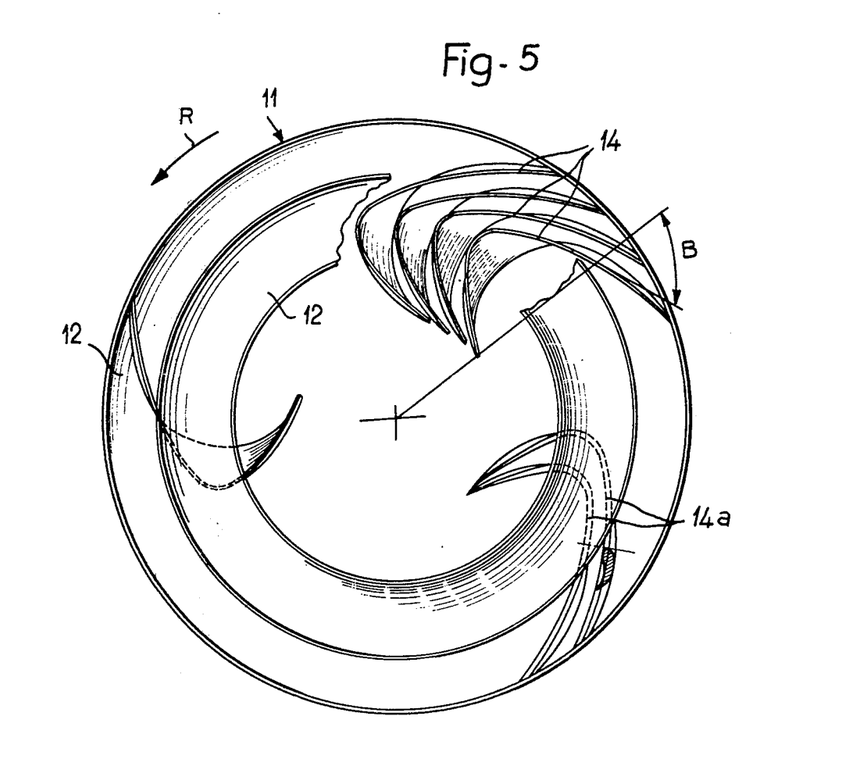
FIG. 5 is a plane view of the turbine at the inlet and outlet end of the fluid with parts broken away and only a certain number of blades illustrated.

FIGS. 4 and 5 show one embodiment of a turbine 11 comprising blades 14 between an inner shell 12 and an outer shell 13. In FIG. 4, the outer shell is cut at 15 and the inner shell at 16 in order better to illustrate the shape of a blade between these two cuts. Similarly, the inner shell illustrated in FIG. 5 is broken away in the top right-hand quarter, and the hub of the outer shell is not shown. The leading edge of the blades 14, which receives the fluid coming from the pump, is inclined relative to the radial plane through an angle B which, in this case, is approximately 70° but which may be between 40° and 75°.

The leading edges are inclined towards the rear of the intended direction of rotation R of the turbine (cf. FIG. 5), starting from the point at which they are closest to the axis of the turbine.

The configuration of each blade is such that it terminates in a trailing edge inclined oppositely to the leading edge, and further such that the path followed by the streams of fluid closest to the centre (those circulating along the inner shell 12) is extended relative to the path followed by the streams of fluid furthest away (those circulating along the outer shell 13), and in particular in relation to what they would be in the case of radial leading edges and/or trailing edges or leading edges and/or trailing edges adjacent a radial plane.

In the same way as before, a decrease in internal friction is obtained in this way.

Figure 6:
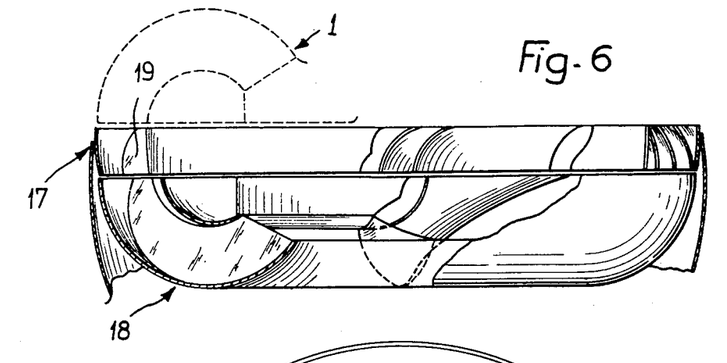
FIG. 6 is a section with parts broken away through two adjacent turbines.
Figures 7, 8:
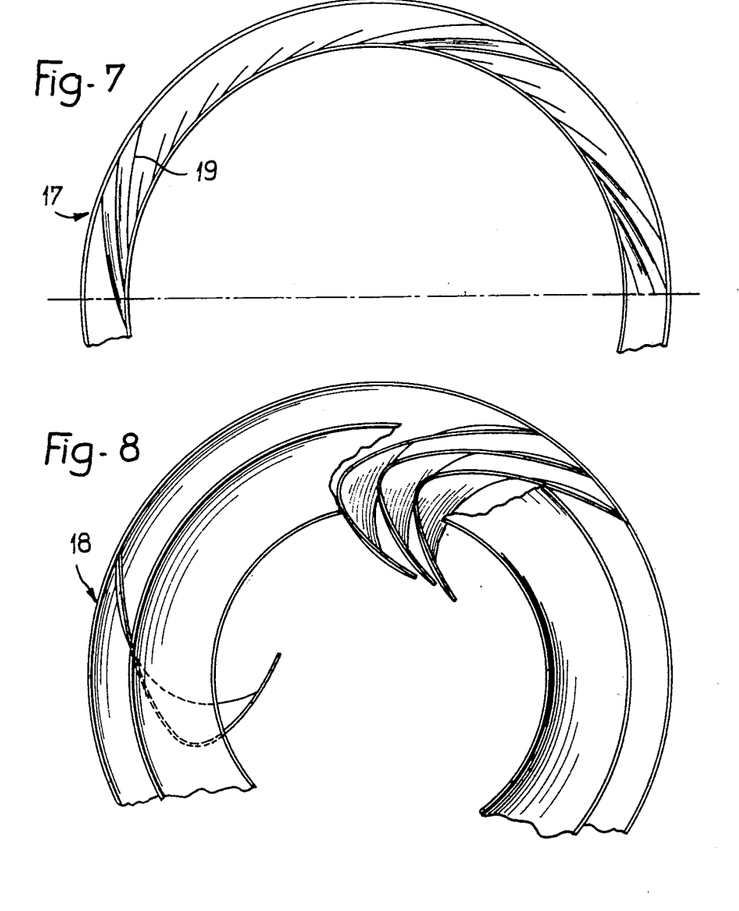
FIG. 7 is a half plan view of the first turbine shown in FIG. 6.
FIG. 8 is a half plan view of the second turbine illustrated in FIG. 6 with only a few blades shown.

FIGS. 6, 7 and 8 illustrate another embodiment of the blades in the case of two consecutive turbines 17, 18 which are similar to the single preceding turbine except in size. The inclination of the leading edges of the blades 19 of the first turbine 17 affords the same advantages as before, this turbine being able to function as a reaction member when it is mounted for free rotation, or alternatively may be coupled to the rest of the system through a differential mechanism with satisfactory results, especially in regard to the reduction in shock losses, without any need to provide variable-pitch blades as already known.

Figure 9:
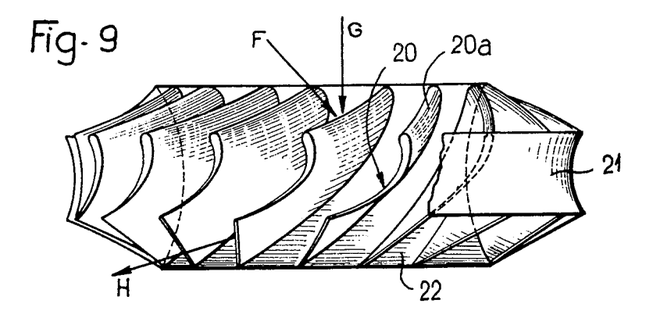
FIG. 9 is an external view of a reaction member with parts broken away.
Figure 10:
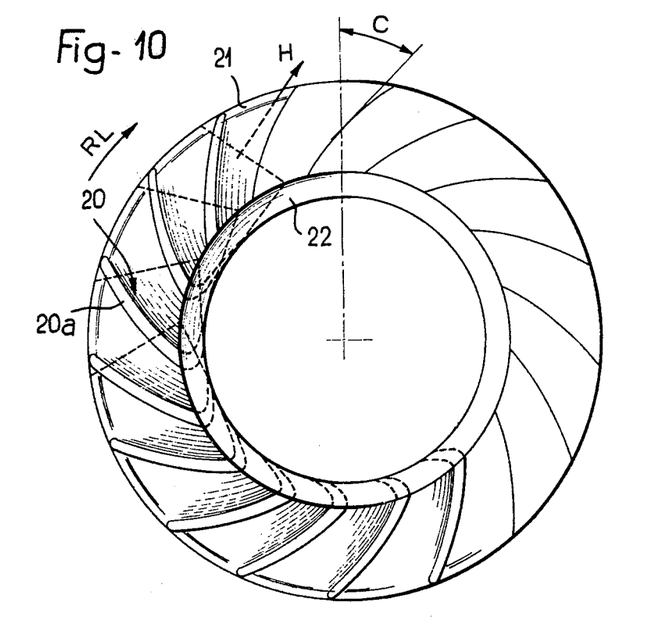
FIG. 10 is a plan view of the reaction member shown in FIG. 9.

FIGS. 9 and 10 illustrate one embodiment of a converter reaction member in which the leading edges 20a of the blades 20 are again inclined between an external band or ring 21 and a central hub 22 intended to be mounted for free rotation in the usual way, the direction of free rotation being indicated by RL in FIG. 10. This free rotation begins when the angle of incidence of the streams of fluid coming from the turbine passes from the direction of the arrow F to the direction of the arrow G, the outlet direction being indicated by the arrows H. As can be seen in FIG. 10, the leading edge 20a of the blades is inclined through an angle C of approximately 45°, although the optimum value of this angle is in the range from 40° to 60°. In this case, a stream of fluid which would attack a blade with a radial leading edge at an angle of 60°, as is the case when the turbine is stationary, now attacks the blade 20 at an angle of only 38° at which the shock losses at the inlet end of the engine are reduced by 66%.

In this case, the leading edges of the blades are inclined in the direction of free rotation, starting from the point at which they are nearest the centre of the system, this direction of inclination having been found by experience to be preferable to the opposite direction. In this case, the blades are above-average in number, especially greater than 17 in number, in order similarly to reduce the shock losses at the output end of the engine, thus avoiding break-down of the streams of fluid in the vicinity of the trailing edge of the blades.

In the case of single-turbine converters, and in order to utilize in the single turbine the increase in energy obtained by the configuration of the blades in the system as a whole, it is possible to decrease the flow cross-section of the channels formed between the blades and the shells and/or the mean outlet radius of the fluid in relation to what they would be with a conventional blade configuration.

An arrangement of this kind is essentially obtained, as illustrated in FIG. 4, by modifying the inner shell 12 relative to what it would be in the case of a conventional configuration as indicated in dotted lines at 12a.

The reduction in flow cross-section may also be obtained by increasing the number or thickness of the blades, this latter case being illustrated in the bottom right-hand quarter of FIG. 5 with the blades denoted by the reference 14a, the profile of one of those blades being shown in section.

Figure 11:
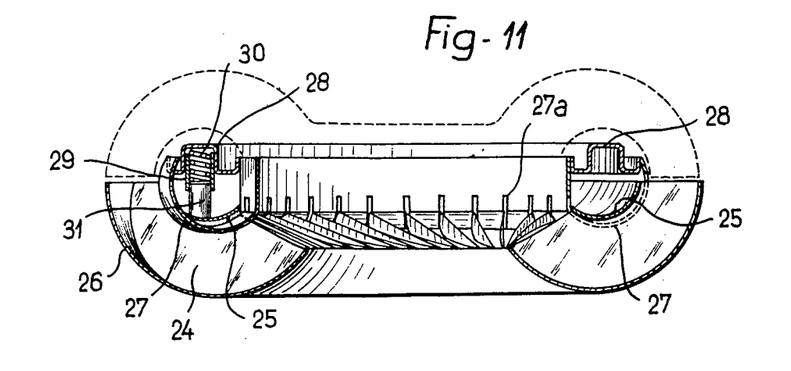
FIG. 11 is a section on the line XI—XI of FIG. 12 through a turbine with variable fluid-flow channels.
Figure 12:
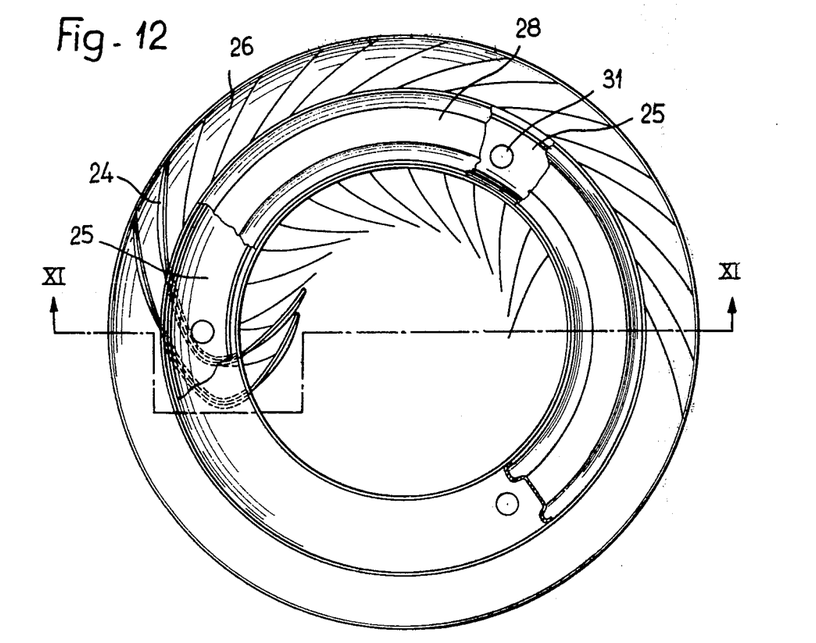
FIG. 12 is a plan view of the turbine illustrated in FIG. 11.

This reduction may also be variable in nature. FIGS. 11 and 12 illustrate an arrangement of this kind, in which the blades 24 are fixed between an inner shell 25 and an outer shell 26, whilst an intermediate shell 27 is provided, being fixed to the blades through corresponding slots 27a and mounted in such a way that it is able to slide along them parallel to the axis of the turbine over a certain section of the surface of the blades which, to this end, extend axially in the vicinity of the inner shell 25.

The intermediate shell 27 surrounds the shell 25 and is assembled from outside the shell 25 relative to the turbine with a ring 28 provided locally with axial tubes 29 accommodating compression springs 30 and mounted to slide on guides 31 fixed to the inner shell 25, the guide forming counter-supports for the springs.

During startup, the turbine being stationary, the fluid circulates at its highest rate of flow. The reduced pressure generated over that surface of the intermediate shell 27 in contact with the fluid causes it to slide towards the position in which the restriction of the flow cross-section of the fluid is at its greatest.

The compressed, opposing springs determine an equilibrium position corresponding to the optimum starting torque.

As the turbine picks up speed, the circulating fluid slows down, its pressure increases and the compressed springs expand and, in doing so, move the ring 28 and the shell 27 to another equilibrium position corresponding to another optimum working position. The guides 31 and tubes 29, of which there are a minimum of three in number distributed over the circumference, provide for correct axial displacement of the shell 27. The edges of the slots in the shell 27 are thus kept at an equal distance from that part of the surface of the blades which is parallel to the axis of the turbine so as to avoid jamming during the movements of the shell 27.

Figure 13:
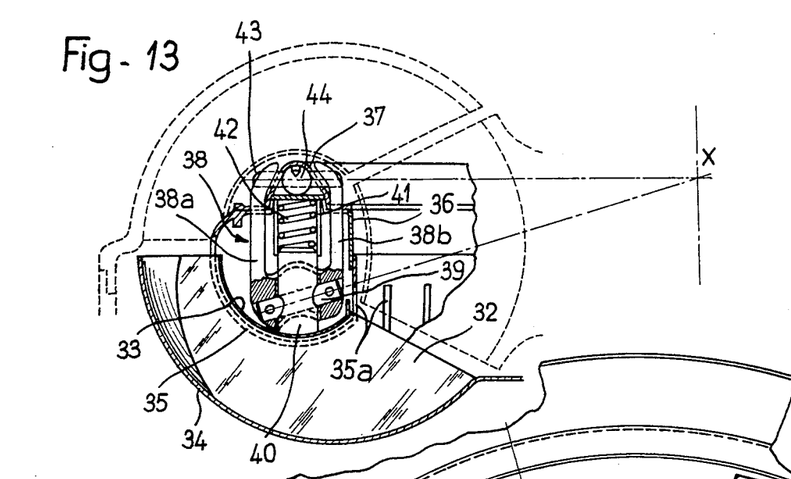
FIG. 13 is a radial section through another embodiment of a turbine with variable fluid-flow channels.
Figures 14, 15:
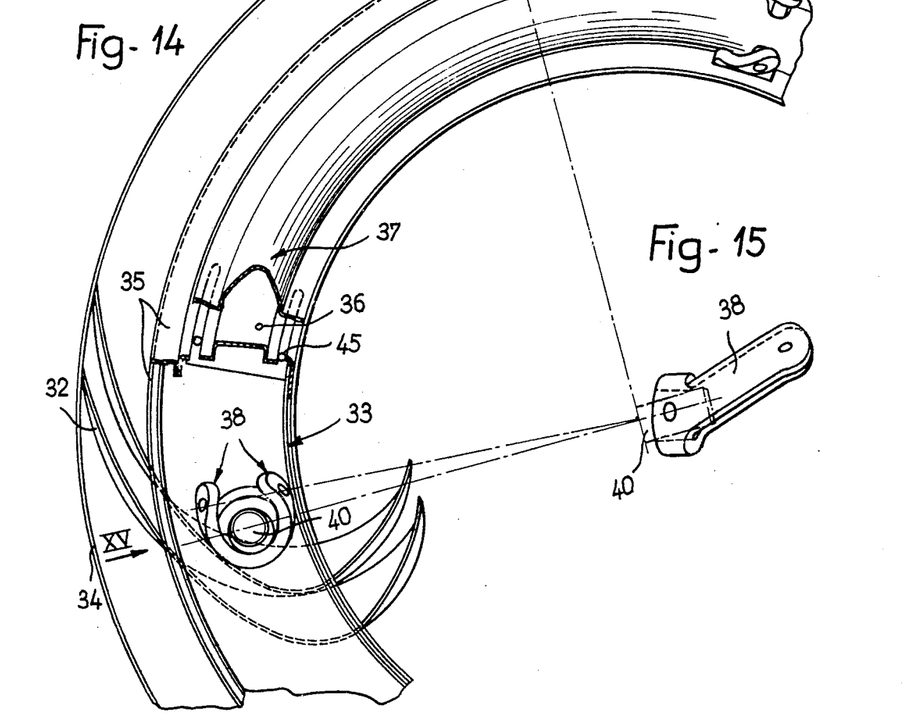
FIG. 14 is a partial plan view of the turbine illustrated in FIG. 13.
FIG. 15 shows a detail of FIG. 14 in the direction of the arrow XV.

FIGS. 13 to 15 illustrate another arrangement of a turbine with a displaceable intermediate shell, designed in particular with a view to avoiding any risk of this shell tilting and jamming during its displacement.

The blades 32 are fixed between an inner shell 33 and an outer shell 34, whilst an intermediate shell 35 is fixed to the blades through corresponding slots 35a. This shell surrounds the inner shell 33 and is assembled from outside the turbine with a ring 36. Above the ring 36 there is another ring 37 which is connected to the inner shell 33 by three stirrups 38 extending through the ring 36 and the ring 37. Each stirrup 38 has two arms 38a, 38b which are pivotally connected, on the one hand, to a pin 39 supported by an axial displacement guide 40 for the intermediate shell 35 which is fixed to the inner shell 33 and which cooperates at its free end with a tube 41 integral with the ring 36 and accommodating a compression spring 42. On the other hand, the arms of the stirrup are pivotally connected to a pin 43 which extends through the ring 37 by way of corresponding openings formed therein and which is engaged through an element 44 forming with it a kind of bracing arranged between the ring 36 and the ring 37. The pins 39 and 43 are radial and converge at a point X situated on the axis of the turbine, whilst the element 44 of the bracing formed with the pin 43 is able to oscillate about its own axis.

The connection between the ring 37 and the ring 36 is a purely sliding connection by resting between the ring 36 and the elements 44 of the articulation arms of the stirrups. The connection may also be established by a slide track or by a ball train, as shown at 45 in FIG. 14. FIG. 14 also shows the fixing of a stirrup 38 to the guide 40, and the fact that the arms of the stirrup are in their normal position slightly inclined relative to the axial plane extending through their articulation axis 39 so as to prevent them from assuming a vertical dead-centre position. Thus, the intermediate shell 35 can be displaced strictly parallel to the axis of the turbine so that, during the corresponding angular pivoting of the stirrups 30 about their axis 39, the ring 37 is rotated about the axis of the turbine and displaced parallel to that axis, the presence of the three stirrups providing both for the required parallelism and for a similar displacement of the ring 38 and shell 35 without any danger of jamming through tilting.

Figure 16:
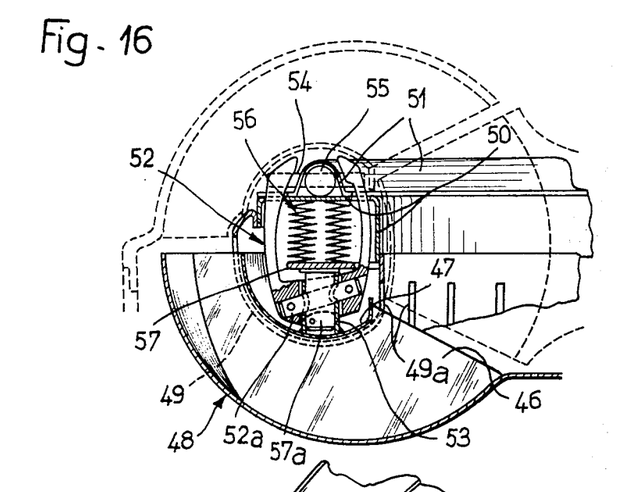
FIG. 16 is a radial section through another embodiment of a turbine with variable fluid-flow channels.
Figure 17:
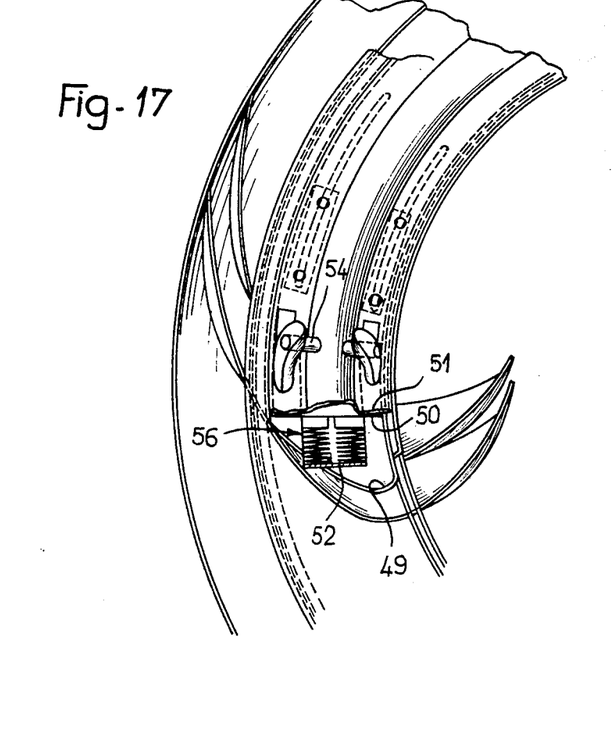
FIG. 17 is a partial plan view of the turbine illustrated in FIG. 16.

FIGS. 16 and 17 relate to another arrangement of a turbine with a displaceable intermediate shell which can be controlled through the pressure of the fluid admitted into the system. The blades 46 are fixed between an inner shell 47 and an outer shell 48, whilst the intermediate shell 49 is fixed to the blades through corresponding slots 49a. The intermediate shell 49 is assembled from outside the turbine with a ring 50 above which there is another ring 51 which is connected to the inner shell 47 through three stirrups 52 arranged in the same way as before. Each stirrup is thus pivoted, on the one hand, about a pin 52a integral with a tubular element 53 fixed to the inner shell, and on the other hand about a pin 54 which extends through the ring 51 by way of corresponding openings and which is engaged through an element 55 forming with it a brace arranged between the ring 50 and the ring 51. A sliding connection is established between the ring 51 and the ring 50 in the same way as before.

Instead of the springs in the previous embodiment, an annular bellows 56 is arranged between the ring 50 and an annular disc 57 centred by three cylindrical members 57a in the three tubular elements 53 corresponding to the stirrups, the pins 52a thereof providing for the fixing of these members 57a in the elements 53 and hence for the fixing of the disc 57 as well. The bellows 56 is made up of two elastic walls made of corrugated metal which are brazed to the ring 50 and the disc 57. This bellows forms a fluid-tight chamber which can be filled with a fluid under pressure adding its force to the natural elastic force of the spring formed by the bellows.

By acting on the pressure of the hydraulic fluid used in the system or converter, this arrangement makes it possible to remote-control or to control in dependence upon a given working parameter the degree of compression or expansion of the bellows and, hence, the position of the intermediate shell 49 which governs the throttling of the stream of fluid circulating in the turbine, i.e. the value of the torque developed by the turbine.

Figure 18:
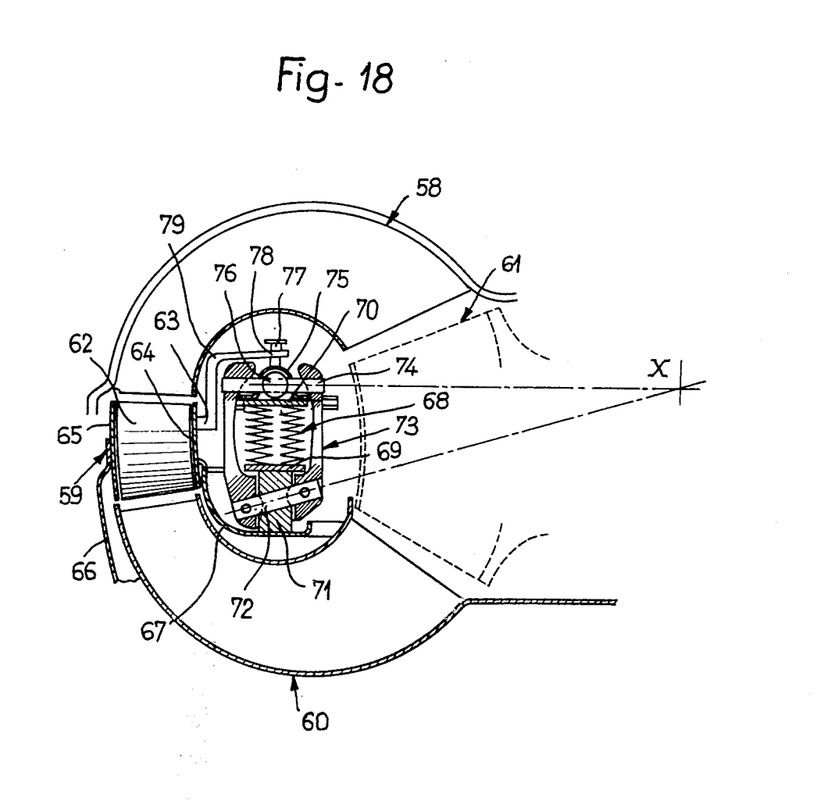
FIG. 18 is a radial section through one embodiment of a converter comprising an intermediate turbine with variable-pitch blades.

FIG. 18 illustrates another arrangement of the converter according to the invention, comprising an intermediate turbine with variable-pitch blades controlled by a bellows similar to the bellows used in the preceding embodiment. The pump is denoted by the reference 58, the intermediate turbine by the reference 59, the main turbine by the reference 60 and the reaction member by the reference 61. The intermediate turbine 59 comprises blades 62 integral with a spindle 63 which is pivotally mounted between an inner band 64 and an outer band 65 which form a flow link between the pump 58 and the turbine 60. The outer band 65 is integral with a shell 66 which may be mounted in any one of a number of known manners. The inner band 64 is integral with a ring 67 carrying the control bellows 68. The bellows 68 is arranged between two rings 69, 70. The ring 69 rests on three cylindrical feet 71 integral with the ring 67, each of which carries a pivot pin 72 of a stirrup 73 which, in addition, is pivotally connected to a pin 74 extending through corresponding openings in a ring 75 having a sliding connection with the ring 70. The pin 74 is engaged through an element 76 forming with it a brace arranged between the ring 75 and the ring 70. The pins 72 and 74 converge at point X on the axis of the turbine. The sliding ring 75 is provided with individual fingers 77 for controlling the pitch of the blades 62. To this end, each finger 77 cooperates with a terminal fork 78 of an angle lever 79 which, in addition, is integral with the pivot axis 63 of the corresponding blade. Thus, the angular position of the ring 75, which is variable in relation to the ring 67 integral with the intermediate turbine according to the degree of compression or expansion of the bellows 68 as a result of the previously explained effect of the connecting stirrups 73, is reflected in a variable orientation of the blades 62 of the turbine in response to the pressure of the fluid admitted into the converter.

Other modifications may of course be made without departing from the scope of the invention.

What I claim as new is:

1. A hydrodynamic transmission system comprising at least one pump and a bladed turbine arranged to form a toroidal fluid circuit, wherein the leading edges of the blades of the pump and turbine are inclined relative to the corresponding radial plane, and wherein these blades are designed in such a way as to extend the path followed by the streams of fluid nearest the centre in relation to the path followed by the streams of fluid furthest away from the centre.

2. A hydrodynamic transmission system as claimed in claim 1, wherein the inclination of the leading edges of the blades of the turbine at least is directed towards the rear of the direction of rotation, starting from the point at which they are closest to the centre of the system.

3. A hydrodynamic transmission system as claimed in claim 1, wherein the angle of inclination of the leading edges is between 40° and 75°, as measured in relation to the median radial plane of each of them.

4. A hydrodynamic transmission system as claimed in claim 1, more especially a torque converter comprising a reaction member mounted for free rotation, wherein the leading edges of the blades of the reaction member are inclined in relation to the corresponding radial plane.

5. A hydrodynamic transmission system as claimed in claim 4, wherein the angle of inclination of the leading edges of the blades of the reaction member is between 40° and 60°, as measured in relation to the median radial plane of each of them.

6. A hydrodynamic transmission system as claimed in claim 4, wherein the inclination of the leading edges of the blades of the reaction member is directed towards the front of the direction of rotation of the reaction member mounted for free rotation, starting from the point at which they are closest to the centre of the system.

7. A hydrodynamic transmission system as claimed in claim 1, wherein the turbine is designed to consume the increase in energy obtained in the system as a whole.

8. A hydrodynamic transmission system as claimed in claim 7, wherein the turbine comprises means for reducing the flow cross-sections for the fluid.

9. A hydrodynamic transmission system as claimed in claim 8, wherein said means for reducing the flow cross-sections for the fluid consist of an intermediate shell between an inner shell and an outer shell for fixing the blades, the intermediate shell being formed with slots by which it is fixed to the blades.

10. A hydrodynamic transmission system as claimed in claim 9, wherein the intermediate shell is designed in such a way as to surround the inner shell of the turbine.

11. A hydrodynamic transmission system as claimed in claim 9, wherein the intermediate shell is kept by springs in the position in which the opening of the flow cross-sections is at its greatest.

12. A hydrodynamic transmission system as claimed in claim 11, wherein the springs are arranged between the inner shell and that part of the intermediate shell which surrounds the inner shell externally of the blades.

13. A hydrodynamic transmission system as claimed in claim 10, wherein a bellows forming a spring for positioning the intermediate shell in dependence upon the pressure of the fluid admitted into the system is arranged between the inner shell and that part of the intermediate shell which surrounds the inner shell externally of the blades.

14. A hydrodynamic transmission system as claimed in claim 10, wherein axial guide means are provided between the intermediate shell and the inner shell of the turbine externally of the blades, and wherein that part of the blades corresponding to the possible travel of the intermediate shell also extends axially.

15. A hydrodynamic transmission system as claimed in claim 10, wherein there is provided between the intermediate shell and the inner shell of the turbine, externally of the blades, a connection comprising at least three stirrups with two arms articulated at their ends along two axes converging at a point of the axis of the turbine, one of said axes being integral with the internal shell whilst the other extends through the wall of a ring having a sliding connection with the intermediate shell, this axis being engaged in an element forming with it a brace designed to be oriented about its own geometric axis.

16. A hydrodynamic transmission system as claimed in claim 1, comprising an intermediate turbine with variable-pitch blades between the aforementioned pump and turbine, and means for adjusting the pitch of the blades, wherein said adjusting means comprise a ring mounted with a degree of freedom of angular movement relative to the turbine governed by the compression or expansion of a bellows forming a spring for positioning said ring in dependence upon the pressure of the fluid admitted into the system, said ring comprising individual connections with individual pitch-orienting levers integral with the blades.

17. A hydrodynamic transmission system as claimed in claim 16, wherein the ring is connected to a support integral with the intermediate turbine by at least three stirrups with two arms articulated at their ends, on the one hand along an axis integral with said support and, on the other hand, along an axis extending through the wall of said ring, the ring having a sliding connection with a ring supporting the bellows, the bellows being annular in shape and arranged between said bellows-supporting ring and a supporting ring on said support.

* * * * *